THERMIONIC DIODE CONVERTER SYSTEM

Filed Sept. 14, 1962

INVENTORS
RODNEY G. HOFF
EUGENE V. CLARK, JR.
BY CHARLES C. WEEKS

[signature]

ATTORNEY

United States Patent Office 3,273,048

Patented Sept. 13, 1966

3,273,048

THERMIONIC DIODE CONVERTER SYSTEM

Rodney G. Hoff, Eugene V. Clark, Jr., and Charles C. Weeks, Canoga Park, Calif., assignors to North American Aviation, Inc.

Filed Sept. 14, 1962, Ser. No. 223,765
18 Claims. (Cl. 322—2)

The present invention is directed to energy conversion systems and more particularly to push-pull triggered thermionic diode inverter systems.

The outputs of thermionic diodes utilized for the conversion of heat to electrical energy are typically between about 0.3 and 1.0 volts D.C. at high currents, i.e. the order of one hundred amperes. Most applications of such converters require an efficient means to increase the voltage output of such devices, since hundreds of diodes would be required if only series operation were used to obtain 110 volts, for example. Further, a single large diode is much more efficient than many small diodes and costs much less to manufacture. While inversion of thermionic diode output to A.C. and its subsequent transformation to high voltage is attractive in principle, conventional methods are highly inefficient. This is apparent when it is considered that conventional mechanical switching techniques are not only difficult, but highly inefficient at the high current outputs of thermionic diodes. It is the primary purpose of this invention to provide an improved method and apparatus for converting the high current D.C. output of thermionic diodes to A.C. by utilizing the bistable nature of the plasma thermionic diode itself to interrupt the current without requiring mechanical switching of the high current output.

An object of the present invention is to provide a method and apparatus for transforming the high current, low voltage output of a thermionic diode converter to any desired voltage current combination in a simple and reliable manner.

Another object of the present invention is to provide a method and apparatus for alternately switching a thermionic diode from an ignited mode to an extinguished mode of operation to provide an alternating voltage.

A further object of the present invention is to provide a method and apparatus for alternately connecting a pair of thermionic diode converters, connected in push-pull arrangement, across a load by sequentially changing the mode of operation of each of the diodes.

A still further object of the present invention is to provide a simple and reliable method and apparatus for converting thermal energy directly to A.C. electrical energy.

These and other objects and advantages of the present invention will be more apparent from the following description and the appended drawings, made a part hereof, in which:

FIGS. 1(*a*) and 1(*b*) show the output characteristic of the thermionic converter utilized in the present invention;

Figure 1A:
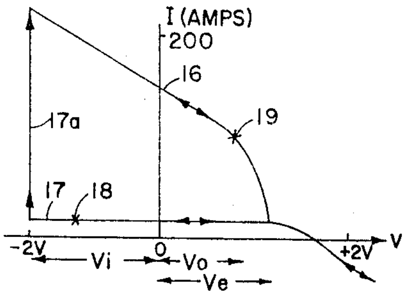
Figure 1B:
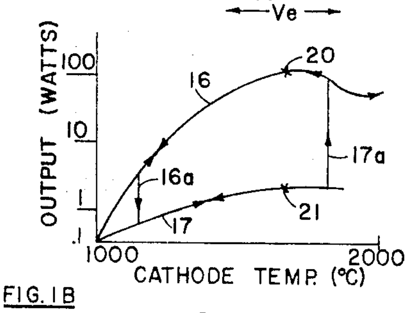

Referring now to the drawings in detail, the cesium vapor thermionic converter diode preferably utilized in the present invention [See U.S. Patent 2,980,819 and Kaye and Welsh, Direct Conversion of Heat to Electricity, chapters 6–11 (John Wiley and Sons, 1960)] has the output characteristics as shown in FIGS. 1(*a*) and 1(*b*). There is a region of output voltages in which there are two stable modes of reversible operation. Irreversible transition from the high current or "ignited" mode, curve 16, to the low current or "extinguished" mode, curve 17, occurs when the output voltage V exceeds a critical value designated the extinction voltage $V_e$. Similarly, a transition from the extinguished to the ignited mode occurs when the output falls below the ignition voltage $V_i$. The values of the extinction and ignition voltages depend upon the converter diode parameters, such as spacing, temperature, and cesium pressure. To operate in the present invention these parameters must be adjusted, in any manner well known in the art, so that $V_i \geqq V_e$.

This characteristic two-mode operation is also illustarted in FIG. 1(*b*) where the diode output is plotted as a function of cathode temperature. The optimum operating points for extinguished and ignited modes are indicated as points 18 and 19 in FIG. 1(*a*) and as points 20 and 21 in FIG. 1(*b*).

Figure 2:
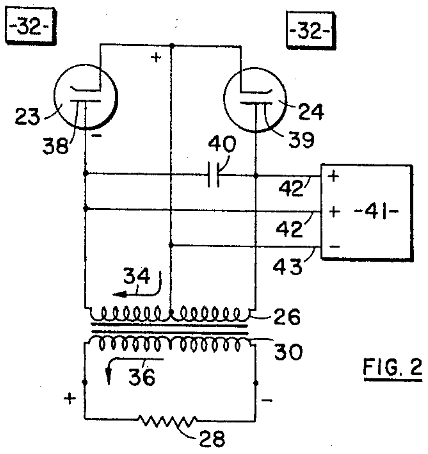
FIG. 2 shows the circuit of the present invention during one mode of operation.
Figure 4:
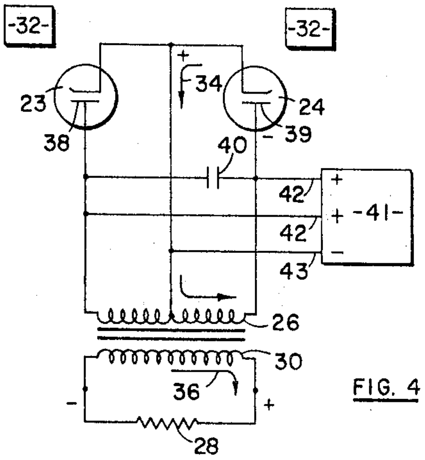
FIG. 4 shows the circuit of the present invention during another mode of operation.
Figure 3:
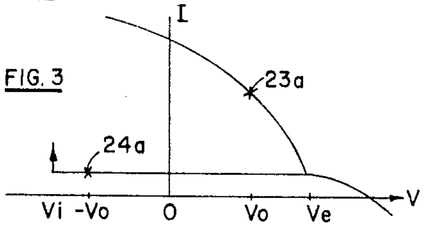
FIG. 3 shows the characteristics of the operation of FIG. 2.
Figure 5:
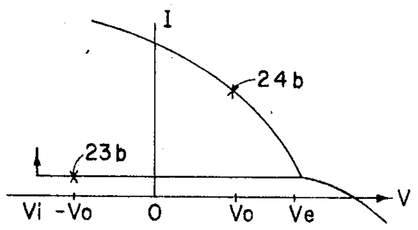
FIG. 5 shows the characteristics of the operation of FIG. 4.
Figure 6:
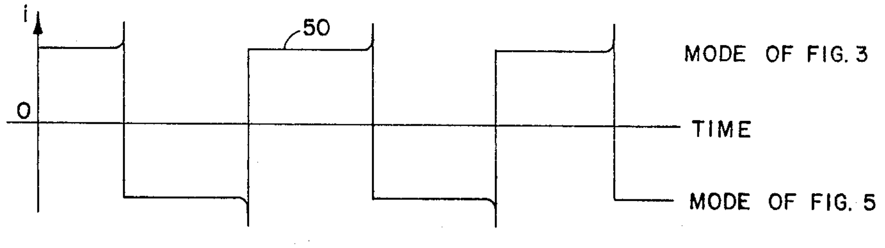
FIG. 6 shows the load current wave form obtained by the present invention.

FIG. 2 shows the arrangement of the present invention which includes two thermionic converters 23 and 24 connected in push-pull across a center-tapped transformer primary winding 26. The load resistance 28 across the secondary winding 30 and the turns ratio are chosen to reflect the optimum load impedance for the converter into the primary winding 26. Considering the circuit where the converter 23 is in the ignited mode and the converter 24 is in the extinguished mode (see FIG. 3 for the respective operating points 23*a* and 24*a*), the current flow in the primary circuit, assuming the application of heat from a source diagrammatically indicated as 32 which may be a single or multiple sources, will be in the direction of arrow 34. The output current from 23 at a voltage $V_o$ induces a counterclockwise current 36 in the secondary 30 and biases diode 24 to $-V_o$. The collector 38 of diode 23 is about 1 v. negative with respect to its emitter. Current beginning to flow in the left side of the push-pull arrangement of the present invention induces a voltage in the right-hand portion which makes the collector 39 of diode 24 1 v. positive with respect to its emitter. It is apparent that such a voltage on collector 39 is insufficient to initiate the arc condition required to move the operating point to the ignited mode. This operating condition is shown in FIG. 3 where 23*a* and 24*a* show the points of operation for diodes 23 and 24, respectively. The capacitor 40 connected between the two collectors 38 and 39 and to a voltage pulse source 41 takes a 1 v. charge. Preferably a positive pulse from generator 41 is alternately connected, in any manner well known in the art, to both collectors by lead 42 and to the emitters by lead 43. Thus, a positive pulse causes only a slight increase in the current through the diode 23, since it is in an ignited, conducting condition. In diode 24, however, this pulse added to the voltage already present strikes the arc and initiates a great flow of current. The potential of the collector 39 drops from about +1 v. to about −1 v. and in so doing drives a −2 v. surge through the capacitor to extinguish diode 23. Diode 24 is now conducting while diode 23 is extinguished. The current flow for this mode of operation is shown in FIG. 4 and the respective points of operation for diodes 23 and 24 are shown in FIG. 5. The next positive pulse from source 41 drives the circuit back to the operating conditions shown in FIGS. 2 and 3. Thus, upon the application of a sequential series of pulses to the diodes 23 and 24, an alternating current wave form 50 such as shown in FIG. 6 is applied to the load represented at 28. The same result is obtained by utilizing a negative pulse and applying it to the diode in the extinguished mode, i.e. point 18 on FIG. 1 or point 23a or 24a of FIGS. 3 and 5.

The external electronic pulser 41, which is of any design well known in the art, can be eliminated from the present invention and alternating current still generated in the windings 26 and 30 of the transformer by alternately applying heat from the source or sources 32. This is apparent when it is considered that the operating point 20 of the ignited mode as shown in FIG. 1(*b*) will, upon lowering of the cathode or emitter electrode temperature, move to the left on curve 16 until it is cooled to a temperature corresponding to the portion 16a of the curve. At this temperature, which is dependent upon the converter parameters such as spacing, pressure and work function, the selection of which is merely skill of the art, the diode which was formerly operating at the ignited point 20 will be extinguished. In a similar manner, if the diode which is operating in the extinguished mode as at point 21 is heated to a temperature equal to or greater than the temperature corresponding to portion 17a of the curve of FIG. 1(*b*), it will ignite and operate at the point 20 as determined by the external load. It is therefore possible without utilizing the pulse circuit 41 to obtain an alternating current output in the present invention by controlling the heating by sources 32 of the diodes 23 and 24. It is further contemplated that the diode operating at point 21 may be driven from the extinguished mode, curve 17, to the ignited mode, curve 16, by applying a pulse of heat to the emitter of the diode of the extinguished mode. This will drive the diode of the ignited mode to an extinguished state. This is apparent from FIG. 1(*a*). The movement on the curve shown in FIG. 1 is from the extinguished curve 17 along the irreversible portion 17a to curve 16 of the ignited mode. This operation is the same as if a negative pulse is applied to the extinguished diode operating at point 18 or a positive pulse is applied to the ignited diode operating at point 19. Thus, application of heat to one of the two thermionic converter diodes to drive it from the extinguished to the ignited mode will automatically drive the diode operating in the ignited mode to the extinguished mode. Operation in this manner requires that the hysteresis loop of FIG. 1(*b*) is narrow, as determined by the particular diode parameters.

It is apparent that the application of a pulse of heat to drive the extinguished diode to an ignited mode of operation can be accomplished in a wide variety of manners well known in the art, for example sequentially increasing and decreasing the fuel supply to one of the heat sources 32 or by using at 32 one or more oscillating heat sources well known in the art. Other means for accomplishing this function include periodically removing a heat barrier between one source 32 and its associated emitter electrode, or if only one source 32 is utilized, deflecting a portion of the heat applied to the diodes and periodically and alternately removing the heat deflecting means adjacent the diode to be driven from the extinguished to the ignited mode. Many other such means will be apparent to those skilled in the art.

Although particular embodiments of the present invention have been described, the present invention is not limited to these specific embodiments, but only by the appended claims.

What is claimed is:

1. Apparatus for directly converting thermal energy to alternating current comprising a pair of thermal energy converter diodes each having a set of emitter and collector electrodes connected in push-pull arrangement adapted to generate D.C. voltages of opposite polarity upon the application of thermal energy, each of said diodes having a first and second mode of operation, load means operatively connected to said push-pull arrangement, and means cooperating with said diodes for alternately switching the mode of operation of said diodes between said first and second modes of operation so that the direct current output of each of said diodes is alternately connected to said load.

2. Apparatus for directly converting thermal energy to alternating current comprising a pair of thermal energy converter diodes connected in push-pull relationship, each of said diodes having a first mode of operation providing a voltage output of a first polarity and a second mode of operation providing a voltage output of a polarity opposite to said first polarity, load means coupled to said push-pull arrangement, and means operatively associated with said push-pull arrangement for controlling the mode of operation of said diodes so that one of said diodes is operating in one mode while the other of said diodes is operating in another mode.

3. Apparatus for directly converting thermal energy to alternating current comprising a pair of thermal energy converter diodes connected in a push-pull circuit arrangement having an output, each of said diodes having a first mode of operation providing a D.C. voltage output of a first polarity and a second mode of operation providing a D.C. voltage output of an opposite polarity, and means cooperating with said push-pull circuit for switching the mode of operation of said diodes so that the direct current output of each of said diodes is alternately coupled to the output of said push-pull circuit, thereby producing an alternating current at said output.

4. The apparatus of claim 3 wherein said last-named means includes means for selectively applying heat to said diodes.

5. The apparatus of claim 3 wherein said last-named means includes at least one variable output heat source operatively associated with said diodes and means for changing the heat input to at least one diode.

6. The apparatus of claim 3 wherein said last-named means includes means exterior to said diodes for applying an energy pulse to at least one of said diodes to change its mode of operation.

7. The apparatus of claim 3 including at least one heat source operatively connected to said diodes, and wherein said last-named means includes means for applying an energy pulse to at least one of said diodes to change its mode of operation.

8. The apparatus of claim 3 including at least one heat source operatively associated with said diodes and wherein said last-named means includes means for selectively applying a thermal energy pulse to at least one of said diodes to change its mode of operation.

9. The apparatus of claim 3 including at least one heat source operatively associated with said diodes and wherein said last-named means includes means for selectively applying an electrical energy pulse to at least one of said diodes to change its mode of operation.

10. The apparatus of claim 3 wherein said last-named means includes a means coupled to said push-pull circuit for applying an electrical pulse to said diodes, said pulse being alternately and sequentially applied to each of said diodes and being of such magnitude and polarity as to change the mode of operation of the diode to which it is applied.

11. Apparatus for directly converting thermal energy to alternating current comprising a pair of thermal energy converter diodes connected in push-pull arrangement, each of said diodes having a first and second mode of operation providing a first and second voltage output, said first and second voltage outputs having opposite polarity, means for applying heat to said diodes to generate said voltage outputs, and means cooperating with said diodes for switching the mode of operation of at least one of said diodes between said first and second modes of operation so that said voltage outputs are alternately connected to an output.

12. Apparatus for directly converting thermal energy to alternating current comprising a pair of thermal energy converter diodes each having an emitter electrode adapted to emit electrons upon the application of heat and a collector electrode, each of said diodes having a first and second mode of operation, one of said modes providing a first voltage output and the other of said modes providing a second voltage output, means connecting each of said collector electrodes to one end of a center tapped transformer, means connecting both said emitter electrodes to said center tap, and means cooperating with said diodes for switching the mode of operation of each of said diodes between said first and second modes of operation to sequentially and alternately change the mode of operation of each of said diodes.

13. The apparatus of claim 12 wherein said last-named means is coupled to said collector electrode.

14. The apparatus of claim 12 including at least one source of heat operatively associated with said emitter electrodes, and wherein said last-named means includes at least one of said heat sources.

15. The apparatus of claim 1 wherein said last named means includes a source of pulsed energy adapted to be applied to said collector electrodes.

16. The apparatus of claim 15 wherein said source is of pulsed electrical energy.

17. The apparatus of claim 1 wherein said last named means includes a source of pulsed energy adapted to be applied to said emitter electrodes.

18. The apparatus of claim 17 wherein said source is of pulsed thermal energy.

References Cited by the Examiner

UNITED STATES PATENTS 2,881,384 4/1959 Durant -------------- 322—2

MAX L. LEVY, *Primary Examiner.*

ROBERT C. SIMS, LLOYD McCOLLUM, *Examiners.*

A. H. TISCHER, J. J. SWARTZ, *Assistant Examiners.*